No. 770,934. Patented September 27, 1904.

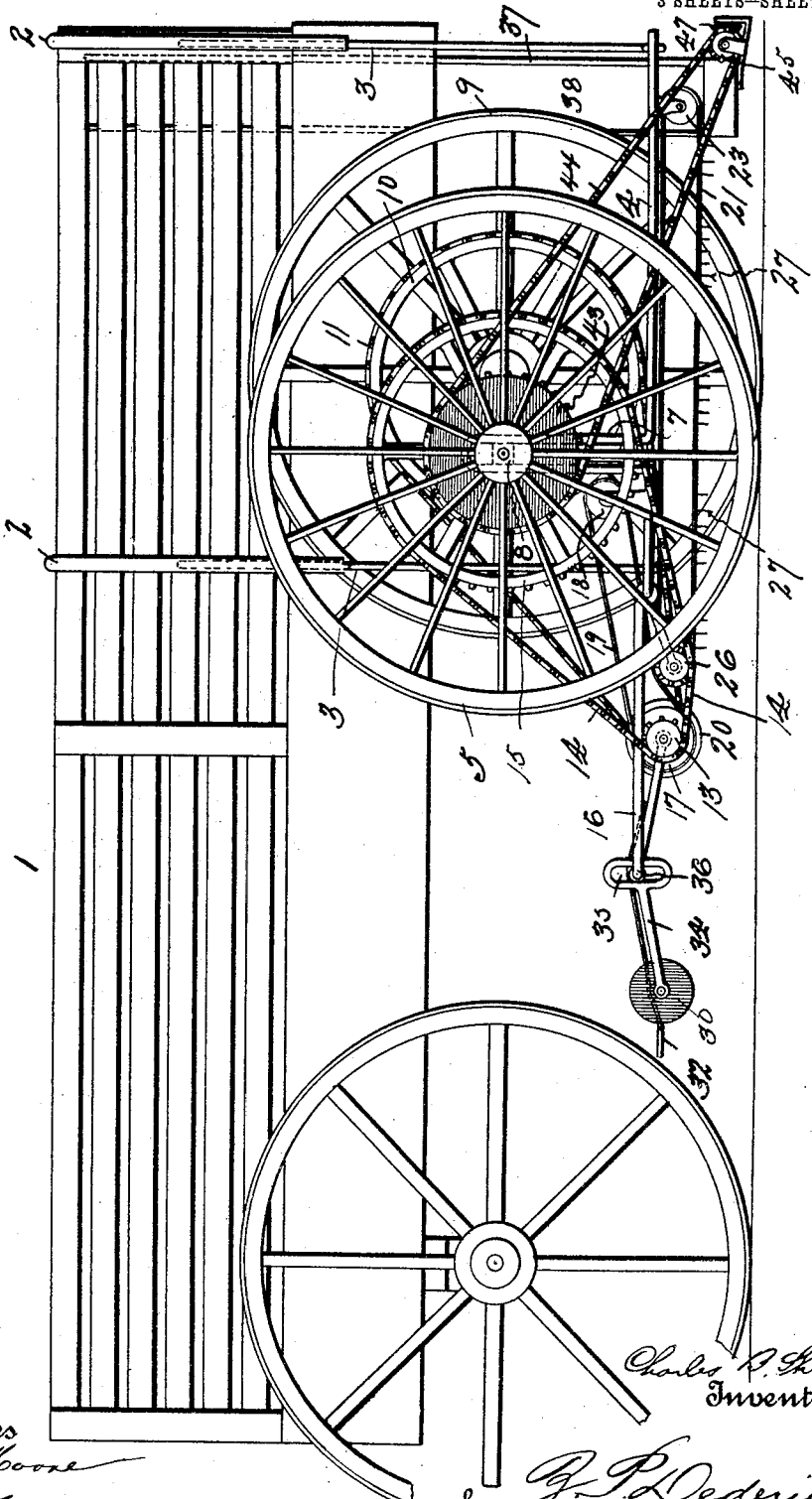

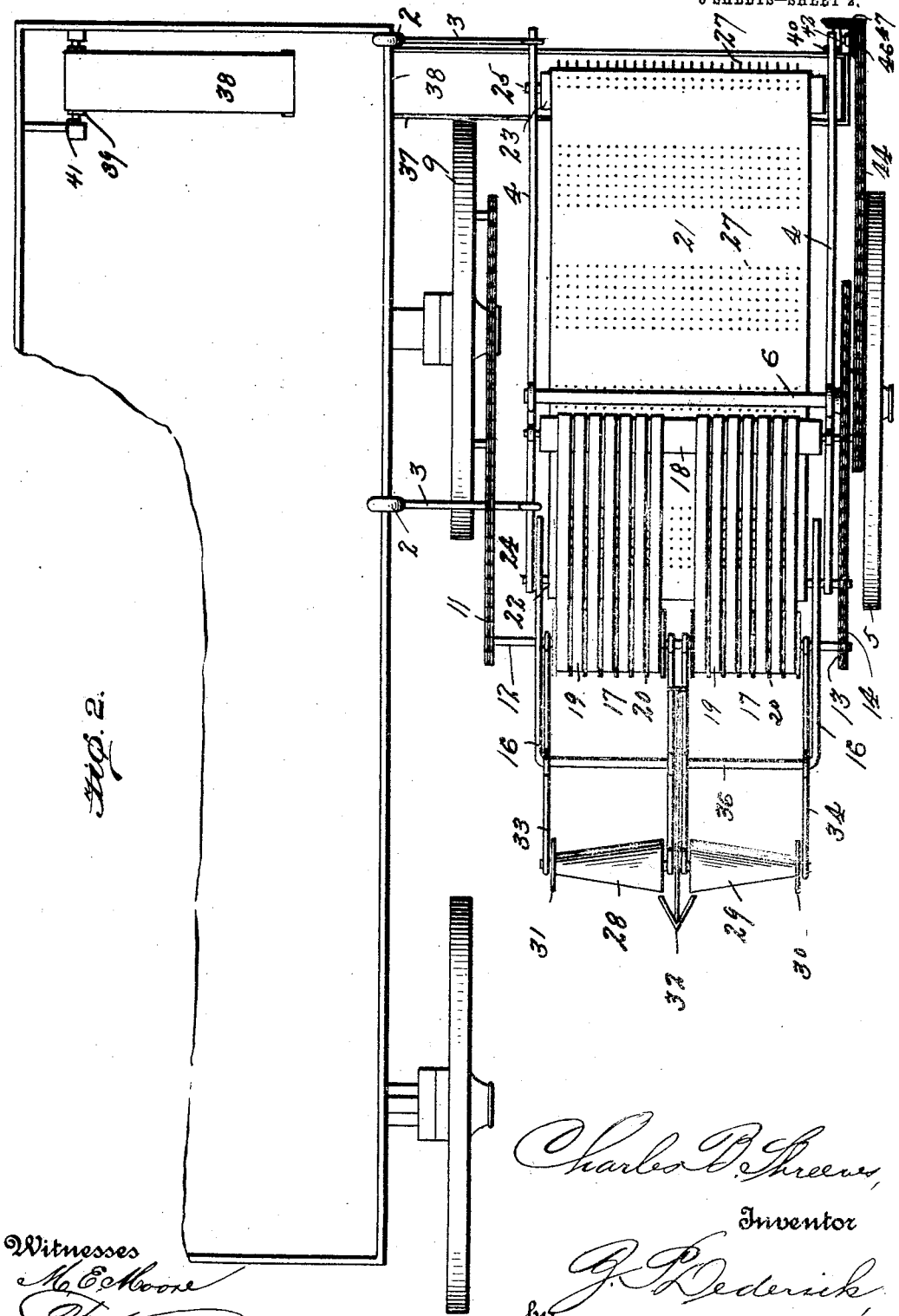

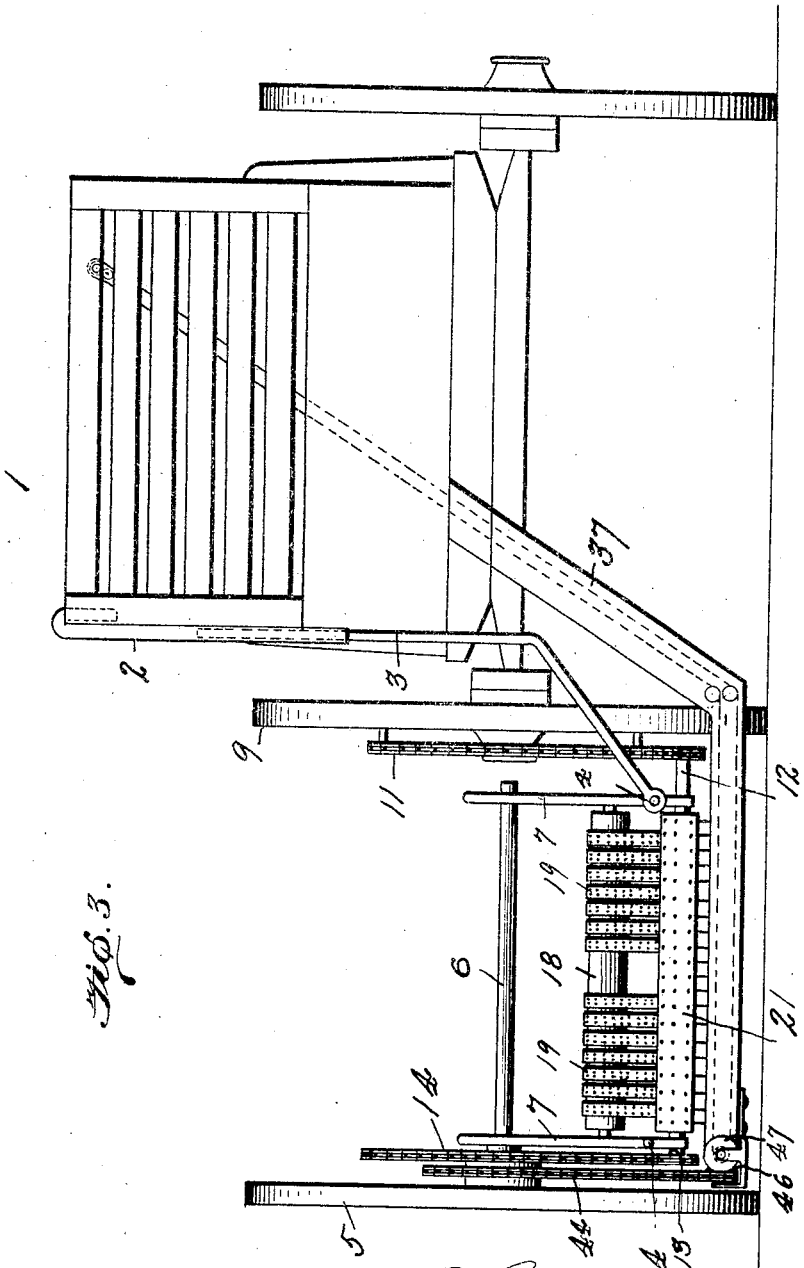

UNITED STATES PATENT OFFICE.

CHARLES B. SHREEVES, OF DENISON, TEXAS.

COTTON-PICKER.

SPECIFICATION forming part of Letters Patent No. 770,934, dated September 27, 1904.

Application filed May 16, 1904. Serial No. 208,285. (No model.)

*To all whom it may concern:*

Be it known that I, CHARLES B. SHREEVES, a citizen of the United States, residing at Denison, in the county of Grayson and State of Texas, have invented certain new and useful Improvements in Cotton-Pickers, of which the following is a specification.

My invention relates to improvements in cotton-pickers, and is intended to be attached to the side or sides of an ordinary farm-wagon and said wagon to be driven over the field of cotton.

I have illustrated the mechanism as applied to only one side of the wagon; but it will be readily understood that two mechanisms may be applied.

The invention consists in certain novelties of construction and combinations of parts, as herein specified, more particularly pointed out in the claims, and illustrated in the accompanying drawings, wherein—

Figure 1 is a side view of so much of a wagon as is necessary to explain my invention with my improved mechanism applied thereto. Fig. 2 is a plan view of the mechanism, showing part of the wagon; and Fig. 3 is an end view of the complete machine.

The cotton-picking mechanism is attached to the wagon 1 by supports 2 2, which are hung or hooked over a suitable portion thereof. Said supports 2 may be cast-iron pipes having inserted therein the smaller pipes 3 3, which telescope therewith and are susceptible of adjustment to any required height within limits, thus adapting the picker for use with different-sized wagons. The frame 4 4 is suitably connected to and carried by said supports 2 3, and upon the frame the mechanical elements of the picker are mounted. The supporting-wheel 5 is journaled on shaft 6, which shaft is carried by uprights or extensions 7 7 of the frame 4. Said shaft is adjustably journaled in boxes 8, which may be moved freely up or down in said extensions 7 7, this adjustment providing for adaptation of the machine to suit different heights of growing cotton.

Located on the hind wheel 9 of the wagon is the toothed wheel 10, over which passes the sprocket-chain 11, driving a smaller sprocket-wheel located on shaft 12 at the front of the machine. Journaled on the near side of said shaft 12 is the sprocket-wheel 13, over which passes the chain 14, which in turn connects with wheel 15, located on the inner side of supporting-wheel 5. Thus said shaft 12 is driven at one end by the wheel 9 and at its other end by wheel 15.

Located on shaft 12, which is located below frame 16 at the front of the machine, are the rollers 17 17, which may be constructed of light galvanized iron. A transverse roller 18, parallel with said rollers 17 17, is suitably journaled in the frame and is connected to the two rollers 17 17 by a series of card-clothing bands 19, which pass over each said rollers and are guided and prevented from running together by projecting rings 20, disposed at intervals on the rollers 17 17. The card of these clothing-bands should be of fine wire set quite close together. Apron 21 is hung partly under the bands 19 and is moved by rollers 22 23, located on shafts 24 25, respectively. Said shaft 24 receives power from and is rotated by sprocket-wheel 26, which wheel is driven by chain 14, passing over wheel 15. The apron 21 is provided with coarse upright long cards 27, which pick or remove the cotton from the card-clothing bands 19 and carry said cotton back to a suitable trough to be described.

The two conical-shaped rollers 28 29, located in the front of the machine, are preferably light galvanized iron rollers, and each is provided with a circular disk, as 30 31. These rollers pass over the stalks of cotton and folding them over spread the branches from the center toward the sides. The dart-shaped spring 32 parts the center branches and prevents them from passing between the inner ends of the conical rollers. The frames 33 34 are pivoted loosely to cross-bar or shaft 12 and are provided with vertical slots 35, through which pass the rod 36 of the frame of the machine. These slots allow the frames 33 34 to be raised or lowered as the conical rollers rise or fall in passing over large branches or other obstacles.

The trough 37 extends from near the top of the floor of the wagon in an inclined direction from said wagon and projects across the picker at the rear and under the end of the apron 21.

An endless conveyer 38, traveling over rollers 39 and 40, located on shafts 41 and 42, respectively, is driven by the sprocket-wheel 43, located on the supporting-wheel 5. Chain 44 passes over said wheel 43 and also over wheel 45 at the rear of the machine. A gear-wheel 46, located on the same shaft with the sprocket-wheel 45, meshes with gear-wheel 47, located on shaft 42, and thus said conveyer is driven through the rotation of wheel 5, sprocket-wheel 43, chain 44, sprocket-wheel 45, gear-wheel 46, gear-wheel 47, and roller 40.

In operation as the wagon is moved along the conical rollers at the front of the machine are revolved as they pass over the stalks of cotton, folding them down and over and spreading the branches from the center toward the sides. The dart-shaped spring spreads the center branches and prevents them passing between the inner ends of the conical rollers. As the machine is moved forward the rolls 17 are revolved, bringing the card-clothing bands in contact with the open cotton. Said bands card the cotton from the bolls and carry said cotton back over the ends of the apron, where the cotton is again removed from the card-bands by the coarse cards on the said apron and carried back over the rear end of the apron, where the cotton is scraped off them by the coarse carding scraping on the side of the trough, where it falls on the conveyer traveling through said trough and is carried up the inclined portion of the trough and deposited in the wagon.

Having thus fully described my invention, what I claim, and desire to secure by Letters Patent, is—

1. The combination with a wagon, of a cotton-picking machine provided with suitable framework, hooked members detachably connected to said wagon, and integral extensions on said framework, adapted to telescope with said hooked members and adjustable therein.

2. The combination with a wagon, of a cotton-picking machine located at one side thereof and provided with a supporting-wheel journaled in suitable frames, vertical arms projecting upward from said frame and arms adjustably connected to said vertical arms adapted to be detachably connected to the wagon.

3. The combination with a wagon, of a cotton-picking machine adjustably connected thereto, supporting means for said machine, an adjustable frame at the front of the machine with means for folding and spreading the cotton-stalks, means for carding said cotton at the rear of said frame, a continuously-moving apron adapted to receive the cotton from the carding means, and a conveyer adapted to receive the cotton from the apron and deposit said cotton in the wagon.

4. The combination with a vehicle of a cotton-picking machine adjustably connected thereto by its frame, a supporting-wheel journaled in said frame, sprocket-wheels on said supporting-wheel and on one wheel of the vehicle, a shaft having rolls thereon provided with gear-wheels driven by chains from said sprocket-wheels, a second shaft carrying a roll and suitably supported, card-clothing bands extending over said rolls, an endless traveling apron disposed to receive the cotton from said bands, and a conveyer at the rear of the machine suitably operated to deposit the cotton in the vehicle.

5. A cotton-picking machine suitably supported, an adjustable frame connected to the front of the machine provided with means for folding and spreading the cotton-stalks, means for carding said cotton, an endless apron suitably driven for receiving the cotton from said carding means, and a conveyer adapted to receive the cotton from said apron and deposit it in a suitable receptacle.

6. The combination with a vehicle of a cotton-picking machine attached to and supported thereby, a wheel journaled in the frame of the machine for additional support, an adjustable frame provided with rollers for folding and spreading the cotton-stalks at the front of the machine, two shafts having rollers thereon connected by card-clothing bands and suitably driven, a second pair of shafts provided with rollers and having an endless apron traveling on said rollers, and a conveyer-belt suitably driven and extending from the machine into the vehicle for depositing the cotton in said vehicle as it is received from said apron.

7. A vehicle, a cotton-picking machine attached thereto, a supporting-wheel for said machine, an adjustable frame having slotted members and guides in said slots for vertical movement of said frame, rollers at the front of the frame for folding and spreading the cotton-stalks, and a separating-spring located between said rollers, two shafts having rollers thereon connected by card-clothing bands, said shafts driven by sprocket-wheels and chains located on the supporting-wheel and one wheel of said vehicle, and means for receiving the cotton from said card-clothing bands and depositing it in said vehicle all combined.

8. A vehicle, a cotton-picking machine attached thereto, a supporting-wheel therefor, an adjustable frame provided with slotted members and guides in said slots for vertical movement of said frame, rollers at the front of the frame for spreading and folding the cotton-stalks, a separating-spring located between said rollers, two shafts having rollers thereon over which travel a series of endless card-clothing bands and driven from said supporting-wheel and a wheel of the vehicle, a second pair of shafts having rollers over which travels an endless apron provided with picker-fingers adapted to receive the cotton from said bands, and means for conveying the cotton from said apron to the vehicle all combined.

9. A vehicle, a cotton-picking machine attached thereto, a supporting-wheel therefor, an adjustable frame provided with slotted members and guides in said slots for vertical movement of said frame, rollers at the front of the frame for spreading and folding the cotton-stalks, a projecting arm located between said rollers; two shafts having rollers thereon over which travel a series of endless card-clothing bands and driven from said supporting-wheel and a wheel of the vehicle, a second pair of shafts having rollers over which travels an endless apron provided with picker-fingers adapted to receive the cotton from said bands, a trough under the rear of said apron and an endless conveyer traveling over rollers, one located in the vehicle and one in the framework and suitably driven, for depositing the cotton from said apron into the vehicle.

10. A vehicle, a cotton-picking machine attached thereto, a supporting-wheel therefor, an adjustable frame provided with slotted members and guides in said frame for vertical movement of said frame, conical rollers at the front of the frame, a separating-spring projecting from between said rollers, a pair of shafts having rollers thereon over which travel a series of carding-bands, one of said shafts driven through the medium of sprocket-wheels located on said supporting-wheel and one wheel of said vehicle and chains from said sprocket-wheels driving wheels located on said shaft; a second pair of shafts having rollers over which travels an endless apron provided with pickers, a trough under the rear of said apron and extending into said vehicle, an endless conveyer traveling in said trough; a shaft having a sprocket-wheel and a miter-gear thereon and a sprocket-wheel on said supporting-wheel having a sprocket-chain adapted to drive said sprocket-wheel and miter-gear and a second miter-gear on one of the shafts of said conveyer driven by said first-mentioned miter-gear, all combined substantially as described.

In testimony whereof I affix my signature in presence of two witnesses.

CHARLES B. SHREEVES.

Witnesses:
C. J. O'MALEY,
W. A. STAUFFACHER.